United States Patent
Wu et al.

(10) Patent No.: US 9,329,992 B2
(45) Date of Patent: *May 3, 2016

(54) DATA STORAGE DEVICE AND FLASH MEMORY CONTROL METHOD

(71) Applicant: Silicon Motion, Inc., Jhubei (TW)

(72) Inventors: Chia-Chien Wu, Hualien (TW);
Yu-Chih Lin, New Taipei (TW);
Yen-Hung Lin, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 197 days.

This patent is subject to a terminal disclaimer.

(21) Appl. No.: 14/096,740

(22) Filed: Dec. 4, 2013

(65) Prior Publication Data

US 2015/0154110 A1    Jun. 4, 2015

(51) Int. Cl.
*G06F 11/00* (2006.01)
*G06F 12/02* (2006.01)
*G06F 11/07* (2006.01)
*G06F 21/00* (2013.01)
*G06F 12/14* (2006.01)

(52) U.S. Cl.
CPC .......... *G06F 12/0246* (2013.01); *G06F 11/073* (2013.01); *G06F 11/079* (2013.01); *G06F 21/00* (2013.01); *G06F 12/1441* (2013.01); *G06F 2212/1052* (2013.01); *G06F 2212/7202* (2013.01)

(58) Field of Classification Search
USPC .................................. 714/6.11, 37; 711/103
See application file for complete search history.

(56) References Cited

U.S. PATENT DOCUMENTS

| | | | | |
|---|---|---|---|---|
| 6,457,126 | B1* | 9/2002 | Nakamura et al. | 713/166 |
| 8,307,151 | B1* | 11/2012 | Caraccio et al. | 711/103 |
| 2002/0099904 | A1* | 7/2002 | Conley | 711/103 |
| 2010/0228907 | A1* | 9/2010 | Shen | 711/103 |
| 2012/0063231 | A1 | 3/2012 | Wood et al. | |
| 2012/0210113 | A1* | 8/2012 | Wood et al. | 713/2 |
| 2013/0081144 | A1* | 3/2013 | Kambayashi | 726/27 |
| 2013/0311705 | A1* | 11/2013 | Cheng et al. | 711/103 |
| 2013/0326118 | A1* | 12/2013 | Liao et al. | 711/103 |
| 2013/0339585 | A1* | 12/2013 | Conley et al. | 711/103 |
| 2014/0025906 | A1* | 1/2014 | Das Purkayastha | 711/155 |
| 2014/0281151 | A1 | 9/2014 | Yu et al. | |
| 2014/0310535 | A1* | 10/2014 | Sibert | 713/193 |

(Continued)

FOREIGN PATENT DOCUMENTS

CN        1534509 A      10/2004
CN        1902599 A      1/2007

(Continued)

OTHER PUBLICATIONS

Office Action of corresponding TW application, published on Nov. 26, 2015.

*Primary Examiner* — Kamini Patel

(74) *Attorney, Agent, or Firm* — Wang Law Firm, Inc.

(57) ABSTRACT

A data storage device using a FLASH memory with replay-protected blocks. The storage space of the FLASH memory is divided into blocks and each block is further divided into pages. A controller is provided in the data storage device to couple to the FLASH memory. The controller manages at least one replay-protected memory block of the FLASH memory. The controller programs two pages into the at least one replay-protected memory block and each page is programmed with a write count of the at least one replay-protected memory block.

12 Claims, 5 Drawing Sheets

(56) References Cited

U.S. PATENT DOCUMENTS

2015/0067239 A1* 3/2015 Chu et al. .................. 711/103
2015/0146486 A1* 5/2015 Wu et al. ................ 365/185.04

FOREIGN PATENT DOCUMENTS

TW 527604 B 4/2003
WO 2012126729 A1 3/2012

* cited by examiner

| Spare Bytes (6B) | Write Count (4B) | 16KB Data |

FIG. 1B

| Spare Bytes (10B) | (16KB-4B) Data | Write Count (4B) |

FIG. 1C

DATA STORAGE DEVICE AND FLASH MEMORY CONTROL METHOD

BACKGROUND OF THE INVENTION

1. Field of the Invention

The present invention relates to data storage devices, and in particular, relates to FLASH memory control methods.

2. Description of the Related Art

Flash memory is a general non-volatile storage device that is electrically erased and programmed. A NAND Flash, for example, is primarily used in memory cards, USB flash devices, solid-state drives, eMMCs (embedded MultiMediaCards), and so on. Generally, a storage array of a Flash memory (e.g. a NAND Flash) comprises a plurality of blocks. Each block comprises a plurality of pages. To release a block as a spare block, all pages of the entire block have to be erased together in an erase operation.

For data security, some blocks of a FLASH memory are allocated to be replay-protected memory blocks (abbreviated to RPMBs). In comparison with the other blocks, the management of the RPMBs requires a higher security level. Data management of the RPMBs is especially important.

BRIEF SUMMARY OF THE INVENTION

A data storage device and a FLASH memory control method are disclosed.

A data storage device in accordance with an exemplary embodiment of the invention comprises a FLASH memory and a controller. The storage space of the FLASH memory is divided into blocks and each block is further divided into pages. The controller is coupled to the FLASH memory to manage at least one replay-protected memory block of the FLASH memory. The controller programs two pages into the at least one replay-protected memory block and each page is programmed with a write count of the at least one replay-protected memory block.

In accordance with another exemplary embodiment of the invention, a FLASH memory control method is disclosed, which comprises the following steps: managing at least one replay-protected memory block of a FLASH memory; and programming two pages into the at least one replay-protected memory block, wherein each page is programmed with a write count of the at least one replay-protected memory block.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1B shows an allocation format for each page of the FAT block RPMB_FAT in accordance with an exemplary embodiment of the invention;

FIG. 1C shows an allocation format for each page of the RPMB FAT block RPMB_FAT in accordance with another exemplary embodiment of the invention;

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1A:
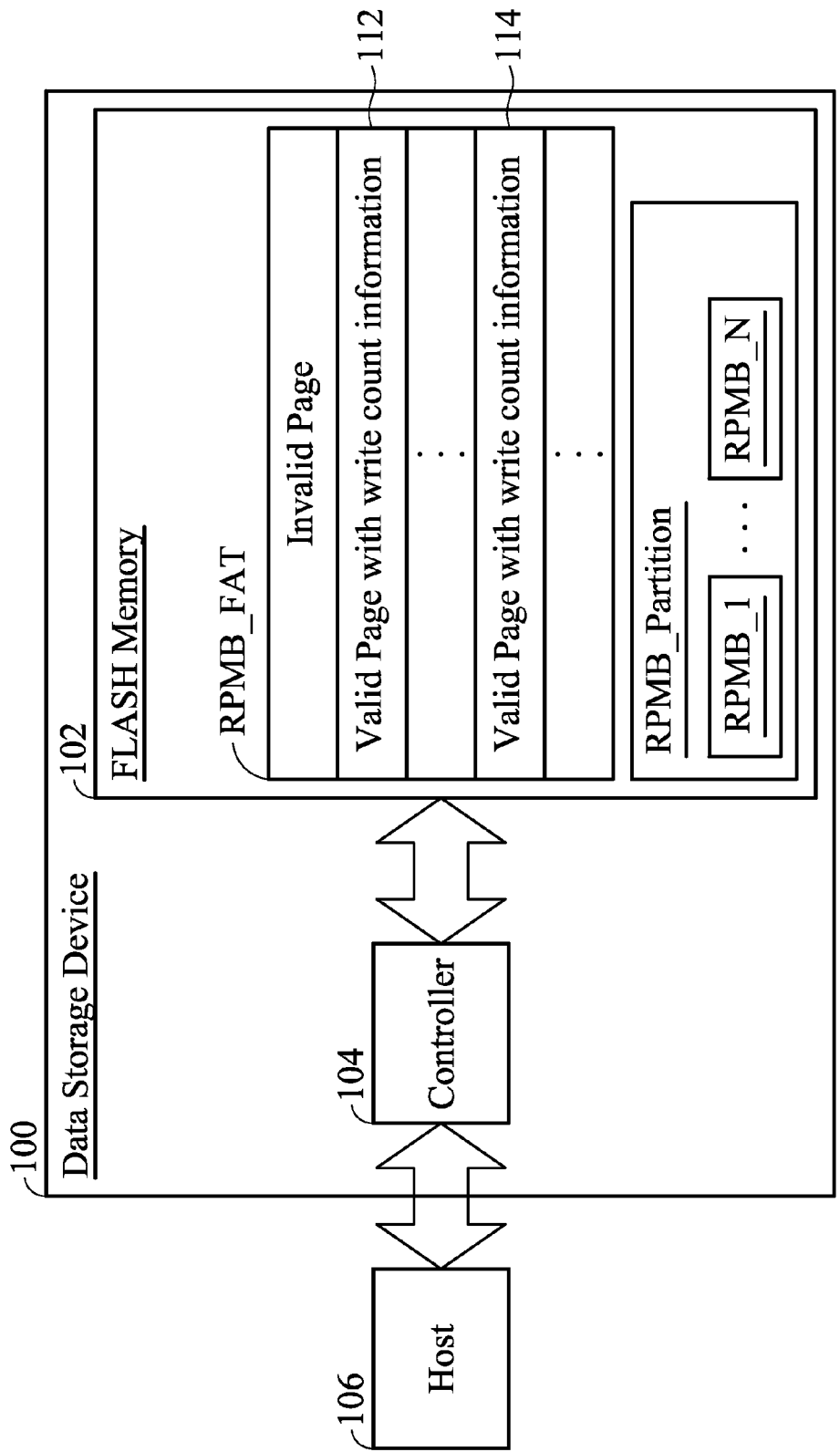
FIG. 1A is a block diagram depicting a data storage device 100 in accordance with an exemplary embodiment of the invention.

FIG. 1A is a block diagram depicting a data storage device 100 in accordance with an exemplary embodiment of the invention. The data storage device 100 comprises a FLASH memory 102 and a controller 104 coupled to the FLASH memory 102. The controller 104 may operate the FLASH memory 102 according to commands issued from a host 106.

The storage space of the FLASH memory 102 is divided into blocks and each block is further divided into pages. For simplicity, only the blocks relating to the replay-protected memory technique are shown in the figure. As shown, the FLASH memory 102 contains a partition RPMB_Partition containing the replay-protected memory blocks RPMB_1 to RPMB N. An authentication key is required to access the replay-protected memory blocks RPMB_1 to RPMB N. The replay-protected memory blocks may be abbreviated as RPMBs. A host, e.g. 106, may issue an RPMB data update command in a single frame or multiple frames, depending on the update data length. A MAC value evaluated from the authentication key is attached in the final frame to be verified by the controller 104. The RPMB data update is allowed only when the MAC value is correct. When the MAC value is incorrect, the RPMB update command is ignored.

Note that a FAT block RPMB_FAT is allocated for data buffering. Update data issued from the host 106 is first buffered in the FAT block RPMB_FAT. When the FAT block RPMB_FAT is filled up, the FAT block RPMB_FAT is regarded as a replay-protected memory block and is classified into the partition RPMB_Partition. Meanwhile, another spare block of the FLASH memory 102 may be allocated to play the role of the FAT block RPMB_FAT.

According to the disclosure, the controller 104 allocates N pages of the FAT block RPMB_FAT of the FLASH memory 102 for each update of data of the replay-protected memory blocks no matter what update data length is issued. N depends on the amount of frames required for the host 106 to issue an update, of the longest data length, of the replay-protected memory blocks. In an exemplary embodiment, each frame transmits 256 bytes of RPMB data and 256 bytes of update information (e.g. a write count of 4 bytes, an update address of 2 bytes, an error detecting code of 2 bytes, a MAC value of 32 bytes and so on). When the update data length is 256 bytes, the host 106 issues the update of RPMB data in a single frame. When the update data length is 512 bytes, longer than the transmission capability (256 bytes) of a single frame, the host 106 issues the update of RPMB data in two frames. In a case wherein the longest update data length of RPMB data is up to 512 bytes, N is set to be 2. The controller 104 allocates 2 (N=2) pages of the FAT block RPMB_FAT of the FLASH memory 102 for each update of data of the replay-protected memory blocks no matter what update data length is issued. When the host 106 just issues a data update of 256 bytes for the replay-protected memory blocks, the controller 104 fills up the allocated 2 pages with dummy data in addition to the 256 bytes of data issued by the host 106. In this manner, each successful RPMB data update should result in N valid pages in the FAT block RPMB_FAT.

Note that each page of the allocated N pages, e.g. page 112 or 114, is written with a write count corresponding to the replay-protected memory block to be updated. Because the update of the write count of each replay-protected memory block is integrated with the data buffering of RPMB data (by each FAT page), the write count of each replay-protected memory block is reliable. FIG. 1B shows an allocation format for each page of the FAT block RPMB_FAT in accordance with an exemplary embodiment of the invention, wherein a part of a spare space of each page of the allocated N pages is allocated for storage of the write count. In the exemplary embodiment shown in FIG. 1B, the spare bytes for each FAT page is reduced to 6 bytes to make room (4 bytes) for the write count while 16 KB are allocated for the data space. FIG. 1C shows an allocation format for each page of the RPMB FAT block RPMB_FAT in accordance with another exemplary embodiment of the invention, wherein a part of a data storage space of each page of the allocated N pages is allocated for storage of the write count. In the exemplary embodiment shown in FIG. 1C, the data space for each FAT page is reduced to (16 KB-4 B) to make room, 4 bytes, for the write count while a sufficient space, 10 bytes, is left for information storage.

The FAT block RPMB_FAT is checked by the controller 104 during a power restoration process, to recognize whether a power failure event happened before and if, so, to get the time of the power failure event. During the power restoration process, when the controller 104 determines that the amount of valid pages in the FAT block RPMB_FAT is a multiple of N, the controller 104 confirms data synchronization within each update of RPMB data. On the contrary, when the controller 104 determines that the amount of valid pages in the FAT block RPMB_FAT is not a multiple of N, the controller 104 ignores the last update of RPMB data.

Figure 2:
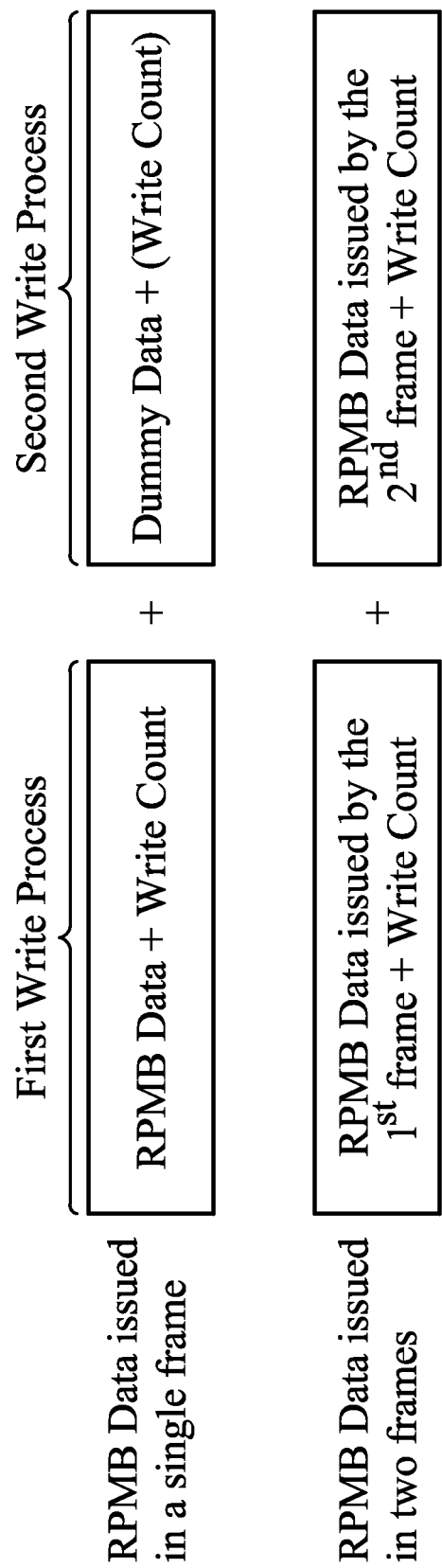
FIG. 2 depicts how an RPMB data update issued from the host 106 is processed by the controller 104 when N is set to be 2.

FIG. 2 depicts how an RPMB data update issued from the host 106 is processed by the controller 104 when N is set to be 2. When the host 106 issues a shorter RPMB update data (e.g. 256 bytes) in a single frame, the controller 104 performs a first write process on the FLASH memory 102 to write the issued RPMB data and the write count of the RPMB corresponding thereto into a $1^{st}$ allocated page in the FAT block RPMB_FAT and then performs a second write process on the FLASH memory 102 to write dummy data (or, further plus the write count the same as that of the first write process) into a $2^{nd}$ allocated page in the FAT block RPMB_FAT. When the host 106 issues a longer RPMB update data (e.g. 512 bytes) in two frames, the controller 104 writes the RPMB data issued in the two different frames separately. As shown, the RPMB data issued in the first frame and the write count of the RPMB corresponding thereto are written into a $1^{st}$ allocated page of the FAT block RPMB_FAT via a first write process and the RPMB data issued in the second frame and the write count which is the same as that of the first write process are written into a $2^{nd}$ allocated page in the FAT block RPMB_FAT via a second write process. In this manner, each successful RPMB data update should result in 2 valid pages in the FAT block RPMB_FAT. In the two pages programmed by the controller, the write counts programmed therein are identical.

Figure 3:
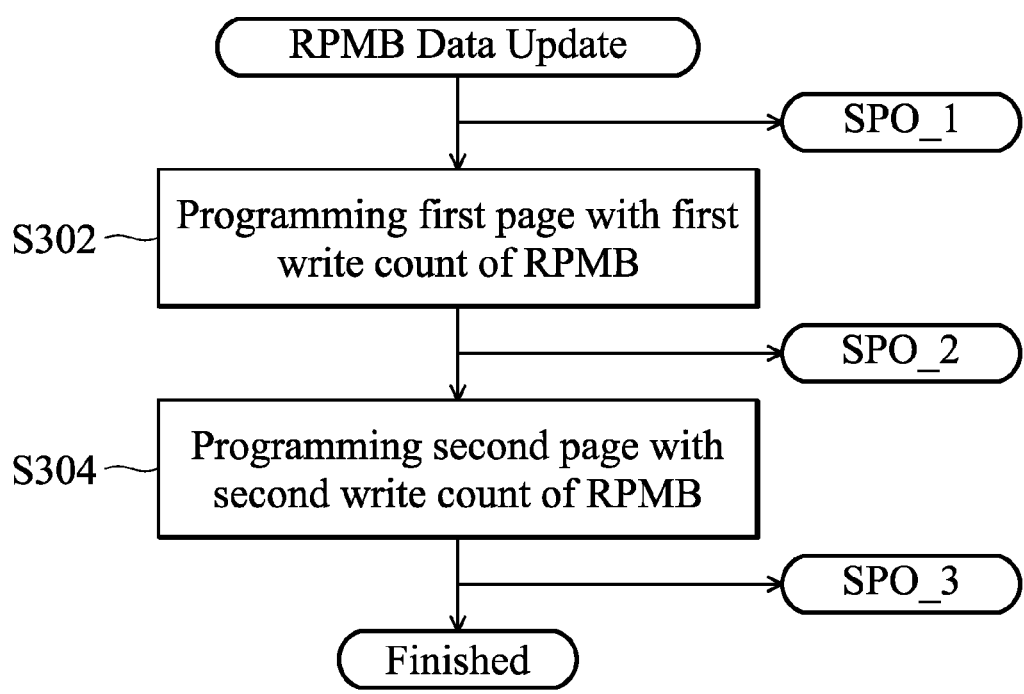
FIG. 3 shows the possible power failure events SPO_1, SPO_2 and SPO_3 during an RPMB data update procedure (with respect to FIG. 2)

FIG. 3 is a flowchart depicting the possible power failure events SPO_1, SPO_2 and SPO_3 during an RPMB data update procedure (with respect to FIG. 2). As shown, the first write process is performed as described in step S302 and the second write process is performed as described in step S304. In step S302, a first page is programmed to contain a first write count. In step S304, a second page is programmed to contain a second write count. After step S304, the RPMB data update procedure may be finished. As shown in FIG. 3, power failure events may occur at any time. A power failure event may occur before the first write process S302 as a first sudden power off event SPO_1. A power failure event may occur between the first write process S302 and the second write process S304 as a second sudden power off event SPO_2. A power failure event may occur after the second write process S304 as a third sudden power off event SPO_3. The different power failure events may be distinguished from each other based on the FAT block RPMB_FAT.

Figure 4:
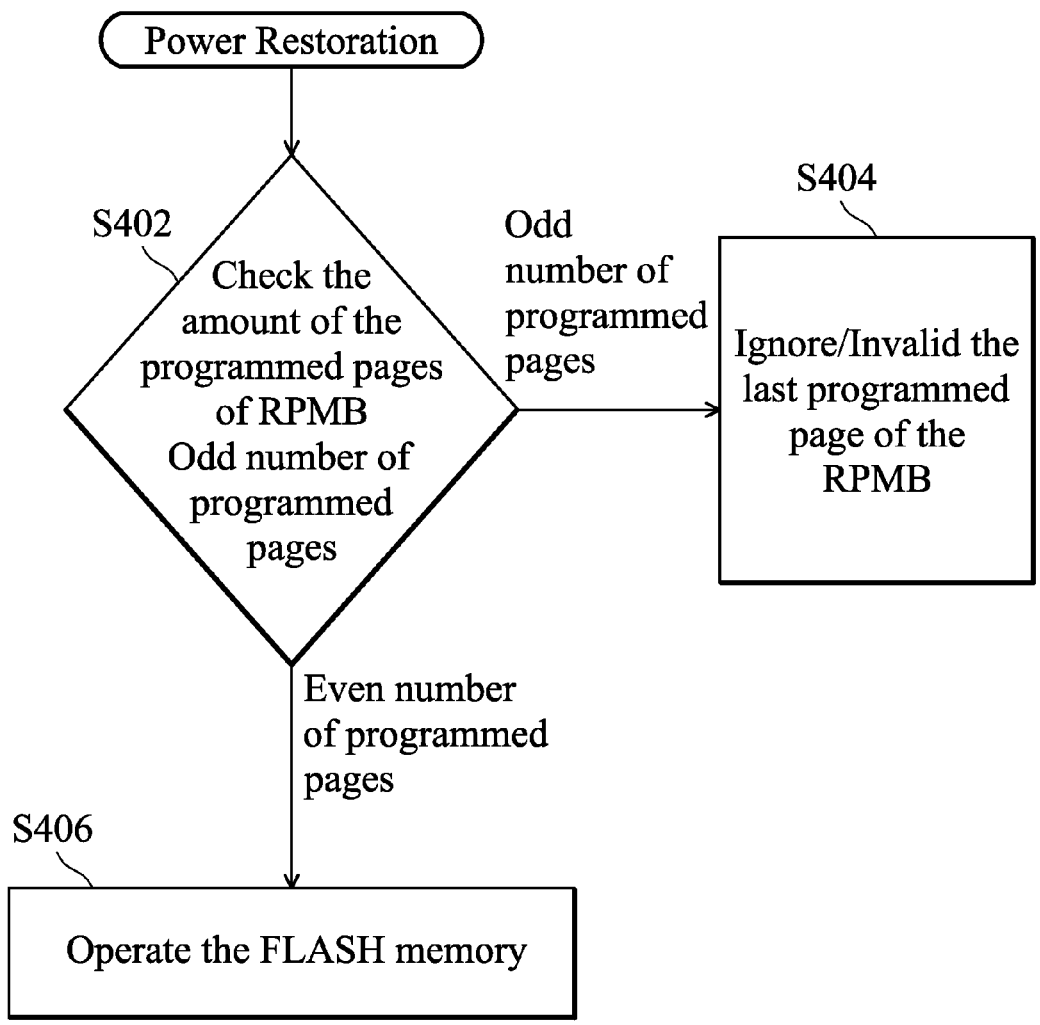
FIG. 4 is a flowchart depicting a power restoration process with respect to the RPMB update procedure of FIG. 3.

FIG. 4 is a flowchart depicting a power restoration process with respect to the RPMB update procedure of FIG. 3. In step S402, the FAT block RPMB_FAT is checked. When there is an odd number of valid pages in the FAT block RPMB_FAT, it means that the power failure event SPO_2 occurred before. Thus, step S404 is performed and thereby the last programmed page of the FAT block RPMB_FAT is invalid and may be ignored. When it is determined in step S402 that there is an even number of valid pages in the FAT block RPMB_FAT, it means that the power failure event SPO_1 or the power failure event SPO_3 occurred before. Because the data update had not happened yet when the power failure event SPO_1 occurred and the data update had been finished when the power failure event SPO_3 occurred, there is no data asynchronous problem due to the power failure event SPO_1 or SPO_3. Thus, data synchronization within each update of RPMB data is confirmed and step S406 is performed to operate the FLASH memory without changing any page status of the FAT block RPMB_FAT.

In some exemplary embodiments, the controller 104 may include a computing unit and a read-only memory (ROM) stored with a ROM code. The ROM code may be coded according to the disclosure to be executed by the computing unit. The disclosed RPMB management, therefore, may be implemented by firmware. Further, any control method for a FLASH memory involving the disclosed RPMB management is also in the scope of the invention.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:

a FLASH memory with a storage space divided into blocks, wherein each block is further divided into pages; and a controller, coupled to the FLASH memory to manage at least one replay-protected memory block of the FLASH memory, wherein:

the controller programs two pages into the at least one replay-protected memory block and each page is programmed with a write count of the at least one replay-protected memory block;

during a power restoration process, the controller checks the at least one replay-protected memory block to recognize whether a power failure event happened;

during the power restoration process, the controller checks the amount of programmed pages of the at least one replay-protected memory block; and during the power restoration process, the controller ignores the last programmed page of the at least one replay-protected memory block when there is an odd number of programmed pages of the at least one replay-protected memory block.

2. The data storage device as claimed in claim 1, wherein: in the two pages programmed by the controller, the write counts programmed therein are identical.

3. The data storage device as claimed in claim 1, wherein: in a first page of the two pages programmed by the controller, the write count is programmed into a spare area of the first page.

4. The data storage device as claimed in claim 1, wherein: when data issued from a host to be programmed into the at least one replay-protected memory block is shorter than two pages, the controller fills the data up to two pages with dummy data.

5. The data storage device as claimed in claim 1, wherein: during the power restoration process, the controller accepts the last two programmed pages of the at least one replay-protected memory block when there is an even number of programmed pages of the at least one replay-protected memory block.

6. The data storage device as claimed in claim 1, wherein: during the power restoration process, the controller confirms data synchronization of the at least one replay-protected memory block when there is an even number of programmed pages of the at least one replay-protected memory block.

7. A FLASH memory control method, comprising:
managing at least one replay-protected memory block of a FLASH memory;
programming two pages into the at least one replay-protected memory block, wherein each page is programmed with a write count of the at least one replay-protected memory block;
checking the at least one replay-protected memory block during a power restoration process to recognize whether a power failure event happened;
checking, during the power restoration process, the amount of programmed pages of the at least one replay-protected memory block; and
ignoring, during the power restoration process, the last programmed page of the at least one replay-protected memory block when there is an odd number of programmed pages of the at least one replay-protected memory block.

8. The FLASH memory control method as claimed in claim 7, wherein:
in every two programmed pages, the write counts programmed therein are identical.

9. The FLASH memory control method as claimed in claim 7, wherein:
in a first page of the each two programmed pages, the write count is programmed into a spare area of the first page.

10. The FLASH memory control method as claimed in claim 7, wherein:
data issued from a host to be programmed into the at least one replay-protected memory block but shorter than two pages is filled up to two pages with dummy data.

11. The FLASH memory control method as claimed in claim 7, wherein:
confirming, during the power restoration process, the last two programmed pages of the at least one replay-protected memory block when there is an even number of programmed pages of the at least one replay-protected memory block.

12. The FLASH memory control method as claimed in claim 7, wherein:
confirming, during the power restoration process, data synchronization of the at least one replay-protected memory block when there is an even number of programmed pages of the at least one replay-protected memory block.

* * * * *